United States Patent

[11] 3,588,629

[72] Inventors Richard J. Millard
Williamstown;
Warren A. Larson, Lanesboro; David G.
Thompson, Williamstown, Mass.
[21] Appl. No. 822,585
[22] Filed May 7, 1969
[45] Patented June 28, 1971
[73] Assignee Sprague Electric Company
North Adams, Mass.

[54] ELECTROLYTIC CAPACITOR WITH SUPPORT MEMBERS AS TERMINALS
3 Claims, 2 Drawing Figs.

[52] U.S. Cl. ........................................................ 317/230, 317/101
[51] Int. Cl. ........................................................ H01g 9/05
[50] Field of Search ........................................... 317/230, 231, 232, 233, 101

[56] References Cited
UNITED STATES PATENTS

| | | | |
|---|---|---|---|
| 2,493,199 | 1/1950 | Khouri et al. .................. | 317/101X |
| 2,877,389 | 3/1959 | Wiener .......................... | 317/101 |
| 2,898,519 | 8/1959 | Foster ........................... | 317/101 |
| 3,161,805 | 12/1964 | Hackler ......................... | 317/101 |
| 3,183,407 | 5/1965 | Yasuda et al. ................. | 317/101 |
| 3,323,023 | 5/1967 | Walker .......................... | 317/101 |
| 3,375,413 | 3/1968 | Brill ............................... | 317/230 |

*Primary Examiner*—James D. Kallam
*Attorneys*—Connolly and Hutz, Vincent H. Sweeney, James Paul O'Sullivan and David R. Thornton

ABSTRACT: A solid electrolyte capacitor assembly is provided which eliminates the conventional external electrode leads. The capacitor is mounted on a conductive substrate with contact being made by the electrodes to electrically isolated portions of the substrate. Appropriate locations on the underside of the substrate are available for interconnection to printed circuit boards or the like.

ELECTROLYTIC CAPACITOR WITH SUPPORT MEMBERS AS TERMINALS

BACKGROUND OF THE INVENTION

This invention relates to solid electrolyte capacitors and, more particularly, to a tantalum solid electrolyte capacitor mounted and encapsulated for planar external connections to circuits.

The capacitor lead connections normally required create construction and attachment problems. The positive lead connection is especially troublesome since it requires that a tantalum riser be welded or pressed into the anode followed by attachment of a solderable electrical connection to the riser. This electrical connection normally joined to the tantalum by welding is soldered to a circuit. The negative lead connection poses less trouble as a lead can be directly soldered to the cathode. The lead problem is especially acute when the capacitor is to be connected in place on a printed circuit board. The solder connections from electrode leads to appropriate areas of the printed board are subject to rupture while the connections interfere with the placement of nearby components and hence are wasteful of space.

Another problem associated with leads is the inductive reactance at high frequencies, due to the self-inductance of the capacitor (including lead wires). This factor becomes important when using capacitors in applications such as digital computer circuits.

It is therefore one object of the present invention to provide a leadless capacitor.

It is another object to provide such a capacitor with reduced inductive reactance at high frequencies.

It is a further object to provide such a capacitor for a printed circuit board connection.

SUMMARY OF THE INVENTION

Broadly, this invention concerns leadless solid electrolyte capacitors and more particularly to a capacitor assembly comprising a tantalum capacitor mounted on, and electrically connected to, conductive mounting members. The unit is encapsulated leaving exposed appropriate planar lead areas located on the mounting members and connected to the anode and cathode of the capacitor. The cathode connection to one conductive member is made by direct contact while the anode connection to another conductive member is made by a conductive element connected to both anode and mounting member.

DETAILED DESCRIPTION OF THE INVENTION

Figure 2:
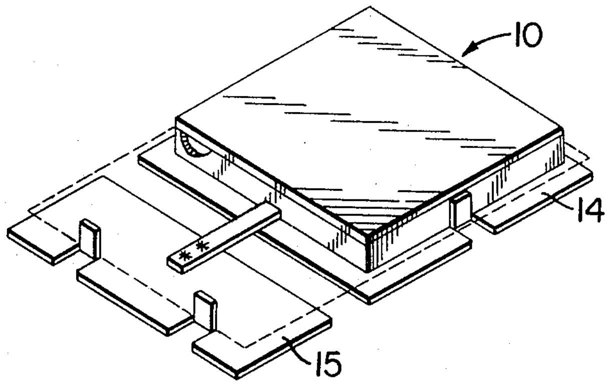
FIG. 2 is a single capacitor unit according to the invention.
Figure 1:
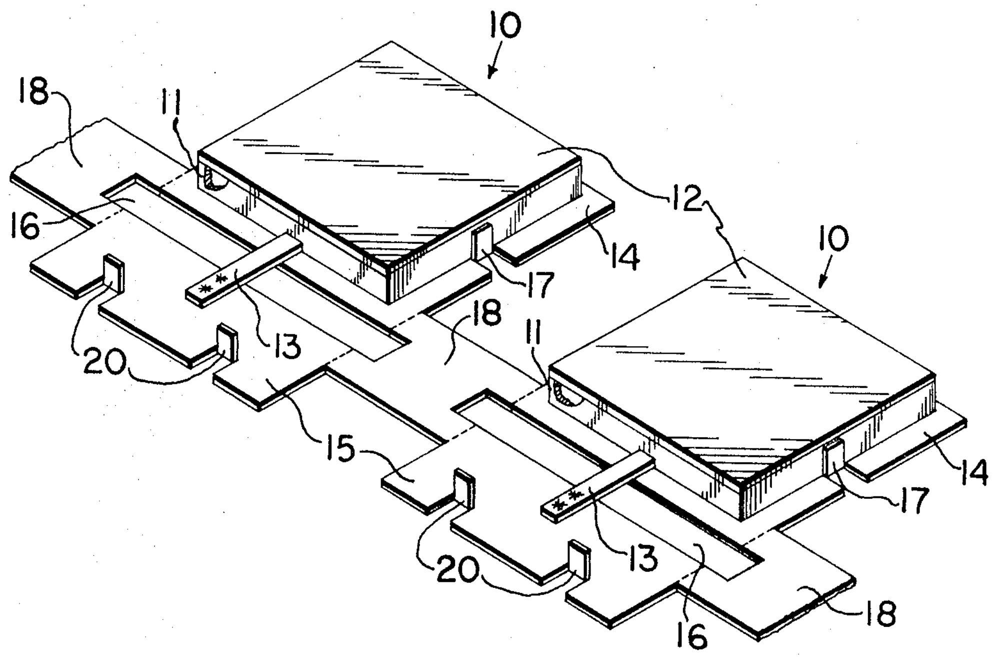
FIG. 1 is a perspective view of the invention showing the mounting of two capacitor units on their supporting members.

The drawing shows units formed according to the invention and prior to encapsulation. Capacitors 10 are solid electrolyte sections of the type described in detail in U.S. Letters Pat. No. 2,936,514, issued to R. J. Millard on May 17, 1960. For purposes of this description, each capacitor section comprises an anode of sintered tantalum which has been anodized to provide a dielectric layer of tantalum oxide. The oxide surface has been coated with a layer 11 of a solid electrolyte, e.g. manganese dioxide, and contact layer 12 of graphite and silver has been provided over a portion of layer 11 to form the cathode contact of the capacitor. Anode lead 13 is spot welded to each anode and extends away from the anode surface.

Each capacitor section is seated on a conductive cathode pad 14 with the anode lead 13 attached to conductive anode pad 15 across isolation slot 16. The capacitor section is centrally located on pad 14 by folding tabs 17 and permanently bonded by soldering the bottom surface of the capacitor to the pad. Lead 13 is attached to pad 15 by welding.

During assembly, 2), 14 and 15 of each unit were connected to each other and to adjacent pads by section 18. After the above anode and cathode connections have been made, and after each unit has been encapsulated with a preferred sealant (shown in broken lines in FIG. 2), sections 18 are severed along the indicated dotted line thereby separating each individual unit and electrically isolating anode pad 14 from its associated cathode pad 15. During encapsulation, tabs 17 and 20 cooperate to provide guide marks for proper capacitor sealing and support for the sealant.

Pads 14 and 15 are formed from an original frame which is preferably of nickel but may be a nonnickel alloy or phosphorous bronze. The entire unit has dimensions of 0.375 inch by 0.265 inch with an isolation slot width of 0.03 inch. Lead 13 is approximately 0.06 inch in length providing substantial reduction in length from the standard lead and reducing the adverse inductive effects encountered at high frequencies.

From the above, it is seen that a single assembly is formed with the underside of the pads available for mounting on appropriate areas of a printed board and serving as leadless contacts to the anode and cathode of the cathode of the capacitor. And while the preferred embodiment utilized a tantalum anode, the invention should be understood to include other film forming metals such as aluminum, zirconium and niobium and, while the preferred electrolyte cited is manganese dioxide, any of the higher oxides of manganese, lead and nickel can be used as well as the organic semiconductors such as quaternary ammonium complex salts.

We claim:

1. A capacitor assembly comprising:
   - a solid electrolyte capacitor having a cathode, an anode of film forming metal, a dielectric oxide film on the surface of said anode, a solid electrolyte disposed between, and in contact with, said film and said cathode, and a conductive lead connected to and extending away from said anode;
   - a first conductive support means upon which said capacitor is mounted;
   - means for electrically connecting the cathode of said capacitor to said conductive support means;
   - a second conductive support means in the same plane as at least a portion of said first support means, but electrically isolated from, said first support means;
   - means for electrically connecting said anode conductive lead to said second support means; and
   - means for encapsulating said capacitor excepting at least a portion of the bottom surface of each of said first and second support means, said bottom surfaces thereby being available for further electrical interconnection.

2. The capacitor of claim 1 wherein said film forming metal is tantalum.

3. A capacitor assembly as described in claim 1 wherein said first support means contains a plurality of tab elements bent upwards so as to stabilize the seating of the capacitor and wherein said second support means also contains a plurality of tabs bent upward so as to provide support for said encapsulant.